(No Model.)
R. FRANKEN.
CULTIVATOR.
No. 534,471. Patented Feb. 19, 1895.
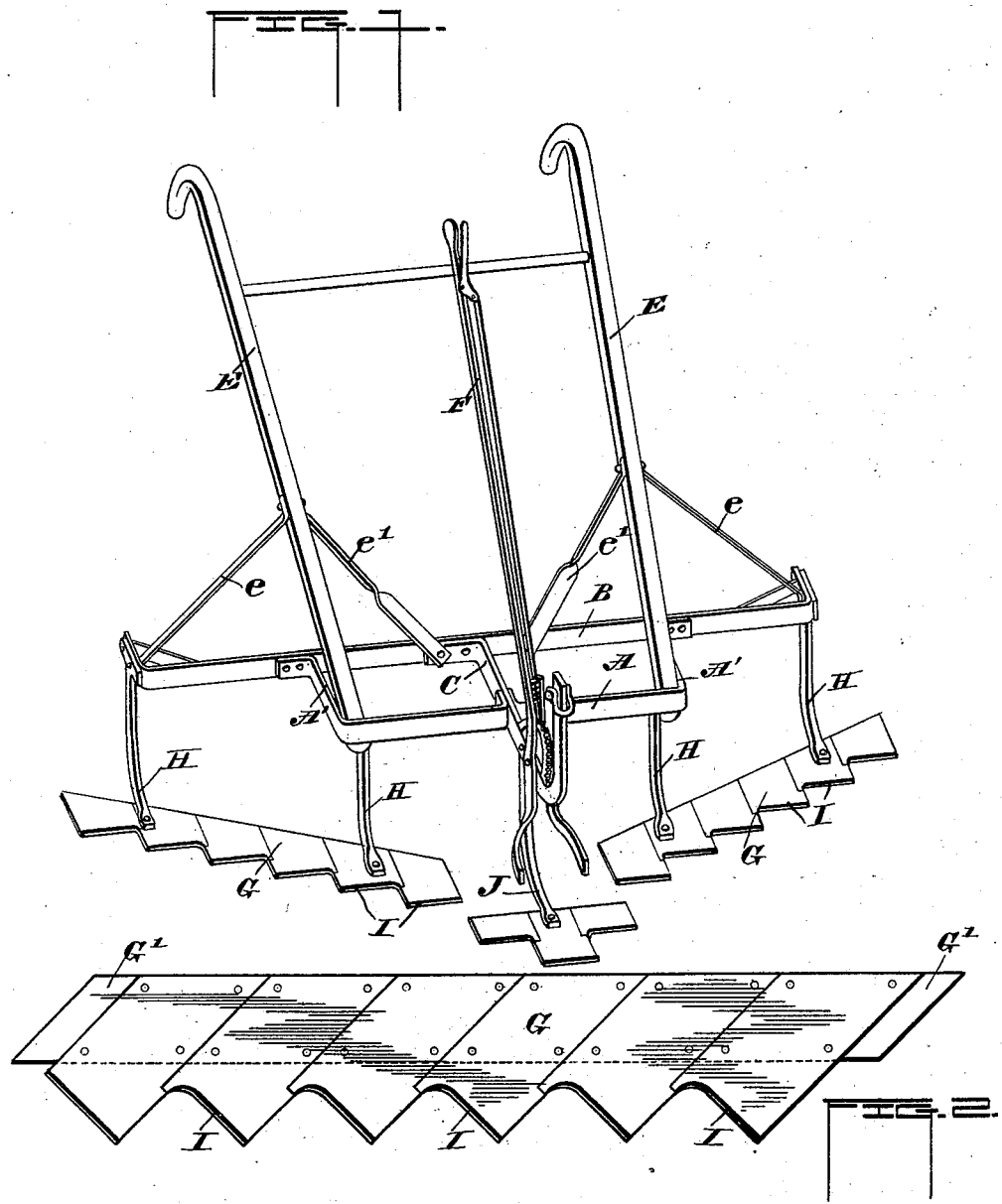
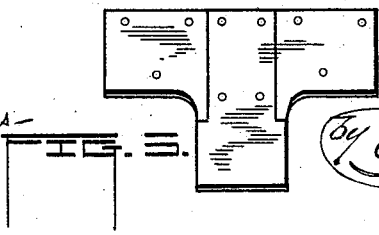
Witnesses:
Frank Blair Rives
W. H. Edwards.
Robert Franken,
Inventor,
by Wm. N. Moore,
Attorney.

United States Patent Office.

ROBERT FRANKEN, OF LOS ANGELES, CALIFORNIA, ASSIGNOR OF ONE-HALF TO WM. L. JOHNSON, OF SAME PLACE.

CULTIVATOR.

SPECIFICATION forming part of Letters Patent No. 534,471, dated February 19, 1895.

Application filed August 13, 1894. Serial No. 520,121. (No model.)

*To all whom it may concern:*

Be it known that I, ROBERT FRANKEN, a citizen of the United States of America, residing at Los Angeles, in the county of Los Angeles and State of California, have invented certain new and useful Improvements in Cultivators, of which the following is a specification.

My invention relates to improvements in cultivators and weed cutters, and the object of the invention is to provide a device which will effectually cultivate the ground and remove all weeds therefrom.

The invention consists broadly of a cutting or cultivating blade having a stepped edge.

The invention further consists in a laterally arranged supporting bar having one end supported in advance of the other and carrying a series of blades having their cutting edges arranged at right angles to the line of travel.

The invention further consists in the details of construction and combination and arrangement of parts hereinafter described and particularly pointed out in the claim.

The invention is illustrated in the accompanying drawings, in which—

Figure 1 is a perspective view of a cultivator embodying my said improvements. Fig. 2 is a plan view of one of the side blades, and Fig. 3 is a similar view of the central blade.

In the drawings the frame of the cultivator will be seen to consist of a cross bar A, having rearwardly extended ends A' to which is secured a second cross bar B, the second cross bar being considerably wider than the front bar. A suitable beam C is provided extending centrally of these two cross bars, to which it is connected, and this beam carries at its forward end the usual wheel which is not shown, and serves also for the attachment of the horse which is to draw the cultivator. The handles E are secured to the forward cross bar and are braced by the inclined braces e, e', connecting them with the rear cross bar as shown in the drawings. The usual lever handle F is provided for adjusting the height of the frame relative to the wheel.

Three blades are preferably provided, one upon each side, and one arranged centrally in advance thereof. The side blades or cutters G consists of the bars G' supported by the depending braces or brackets H one secured to the end of the rear cross bar and the other to the end of the front cross bar, and as the front cross bar is shorter the bars G' will be inclined inward toward the forward center of the frame.

Upon the bar G' are mounted a series of cutting blades which are arranged in the form of steps thus presenting cutting faces I, which are at right angles to the line of draft.

The cutters are preferably of the shape shown in Fig. 2 in which it will be seen that each blade has its corner extended forward slightly providing a rounded connection with the adjacent blade.

The central cutter is of the form shown in Fig. 3 and is suspended from the tongue or beam by the brace or bracket J.

All cutting the blades are preferably held at a slight inclination to the ground.

In operation when the blades are drawn through the ground at any desired distance below the surface thereof they agitate the ground amply and at the same time leave it smooth so that it is not necessary to subsequently use a harrow or similar device. Further than this the device effectually cuts all weeds as they cannot slip around the blades as is true of the ordinary form of cultivator.

Having thus described my invention, what I claim is—

A cultivator comprising the forward transverse bar having rearwardly extending ends, the rear transverse bar secured to said ends, the tongue secured centrally of said bars, the handles secured to the ends of the forward bar and inclining upwardly and rearwardly, the braces connecting the handles with the rear transverse bar, the converging cutter bars suspended from the ends of the transverse bars, and the central advanced cutter suspended from the tongue, substantially as described.

In testimony whereof I affix my signature in presence of two witnesses.

ROBERT FRANKEN.

Witnesses:
JOHN H. SEGGER,
N. A. POUNDS.